(12) United States Patent
Endo

(10) Patent No.: US 11,741,077 B2
(45) Date of Patent: Aug. 29, 2023

(54) SERVER DEVICE, DATA DISTRIBUTION SYSTEM, DATA PROVISION METHOD, AND RECORDING MEDIUM

(71) Applicant: Mitsubishi Electric Corporation, Tokyo (JP)

(72) Inventor: Hiroaki Endo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 3 days.

(21) Appl. No.: 17/263,295

(22) PCT Filed: Sep. 28, 2018

(86) PCT No.: PCT/JP2018/036322
§ 371 (c)(1),
(2) Date: Jan. 26, 2021

(87) PCT Pub. No.: WO2020/065925
PCT Pub. Date: Apr. 2, 2020

(65) Prior Publication Data
US 2021/0149877 A1 May 20, 2021

(51) Int. Cl.
*G06F 16/23* (2019.01)
*G06F 16/27* (2019.01)
*G06F 16/22* (2019.01)

(52) U.S. Cl.
CPC .......... *G06F 16/2365* (2019.01); *G06F 16/22* (2019.01); *G06F 16/2358* (2019.01); *G06F 16/27* (2019.01)

(58) Field of Classification Search
CPC ...... G06F 16/2365; G06F 16/27; G06F 16/22; G06F 16/2358
See application file for complete search history.

(56) References Cited

U.S. PATENT DOCUMENTS

2009/0265106 A1* 10/2009 Bearman .................. G06N 5/02
701/300
2011/0261049 A1* 10/2011 Cardno .................. G06Q 40/04
345/419

(Continued)

FOREIGN PATENT DOCUMENTS

| JP | 2002-133398 A | 5/2002 |
| JP | 2011-138317 A | 7/2011 |
| WO | 2016/157271 A1 | 10/2016 |

OTHER PUBLICATIONS

International Search Report dated Dec. 11, 2018 issued in the corresponding International Application No. PCT/JP2018/036322 (and English translation).

(Continued)

*Primary Examiner* — Jensen Hu
(74) *Attorney, Agent, or Firm* — Posz Law Group, PLC

(57) ABSTRACT

A data collector collects device data obtained from a device that is placed, for example, at a home, a workplace or the like. A distribution data generator adds ancillary information (for example, a time, a unit, precision, a resolution, a content of processing, a manufacturer, a model number or the like) to the device data collected by the data collector, thereby generating distribution data. A data provider provides, to an outside, (for example, to a data usage server), the distribution data generated by the distribution data generator.

13 Claims, 18 Drawing Sheets

(56) References Cited

U.S. PATENT DOCUMENTS

| | | | | |
|---|---|---|---|---|
| 2014/0244198 A1* | 8/2014 | Mayer | ............... | G01N 33/007 |
| | | | | 702/104 |
| 2014/0244834 A1* | 8/2014 | Gu | ............... | H04W 4/21 |
| | | | | 709/224 |
| 2015/0123654 A1* | 5/2015 | Gagnon | ............ | H02J 13/00017 |
| | | | | 324/251 |
| 2016/0187961 A1* | 6/2016 | Elibol | ............... | G06F 9/54 |
| | | | | 345/173 |
| 2016/0342906 A1* | 11/2016 | Shaashua | ............ | H04L 67/12 |
| 2017/0147927 A1 | 5/2017 | Hwang et al. | | |
| 2018/0097886 A1 | 4/2018 | Inoue | | |
| 2019/0094827 A1* | 3/2019 | Park | ............... | G05B 15/02 |

OTHER PUBLICATIONS

Extended European Search Report dated Aug. 4, 2021 issued in corresponding EP patent application No. 18935399.8.
Office Action dated Jul. 18, 2022, issued for the corresponding EP Patent Application No. 18935399.8.

* cited by examiner

FIG. 3A

```
"Power":"On"
"Mode":"Cool"
"Fan speed":"Auto"
"Set temperature":"26.0"
"Room temperature":"28.5"
```

FIG. 3B

```
"Date":"2018/4/1 12:34:56"
"Date type":"UTC"
"Appliance type":"Room Air Conditioner"
"Manufacturer":"ABC Corporation"
"Model Name":"ABC12345"
"Serial Number":"ABC12345001"
"Unit":"°C"
"Resolution":"0.5"
"Measurement environment":"10 bit AD converter"
"Processing":0
"Manufacturer":"XYZ Technology"
"Sensor Model":"XYZ12345"
"Serial Number":"XYZ12345001"
```

FIG. 3C

```
{
    "header":{
        "Manufacturer":"ABC Corporation",
        "Model Name":"ABC12345",
        "Serial Number":"ABC12345001"
    },
    "payload":{
        "Date":"2018/4/1 12:34:56",
        "Date type":"UTC",
        "Appliance type":"Room Air Conditioner",
        "Power":"On",
        "Mode":"Cool",
        "Fan speed":"Auto",
        "Set temperature":"26.0",
        "Sensor type":"Room temperature",
        "Value":"28.5",
        "Unit":"°C",
        "Resolution":"0.5",
        "Measurement environment":"10 bit AD converter",
        "Processing":0,
        "Manufacturer":"XYZ Technology",
        "Sensor Model":"XYZ12345",
        "Serial Number":"XYZ12345001"
    }
}
```

FIG. 4A

```
{
   "header":{
      "Manufacturer":"BCD Corporation",
      "Model Name":"BCD23456",
      "Serial Number":"BCD23456002"
   },
   "payload":{
      "Date" : "2018/4/1 12:35:07",
      "Date type":"UTC",
      "Appliance type":"Temperature sensor",
      "Value":"28.2",
      "Unit":"°C",
      "Resolution" : "0.1",
      "Measurement environment":"10 bit AD converter",
      "Processing":0
   }
}
```

FIG. 4B

```
{
   "header":{
      "Manufacturer":"CDE Corporation",
      "Model Name":"CDE34567",
      "Serial Number":"CDE34567003"
   },
   "payload":{
      "Date" : "2018/4/1 12:36:18",
      "Date type":"UTC",
      "Appliance type":"Motion detector",
      "Value":"345",
      "Unit":"mV",
      "Resolution" : "5",
      "Measurement environment":"10 bit AD converter",
      "Processing":0
   }
}
```

FIG. 11

```
Manufacturer, Model Name, Unit, Resolution, ...
YZA Technology, YZA23456, °C, 0.5, ...
YZA Technology, XXXXXXXX, °F, 1, ...
```

FIG. 12

```
{
    "header":{
        "Manufacturer":"DEF Corporation",
        "Model Name":"DEF4567",
        "Serial Number":"DEF4567004"
    },
    "payload":{
        "Date":"2018/4/1 12:37:29",
        "Date type":"UTC",
        "Appliance type":"Room Air Conditioner",
        "Power":"On",
        "Mode":"Cool",
        "Fan speed":"Auto",
        "Set temperature":"26.5",
        "Sensor type":"Room temperature",
        "Value":"28.5",
        "Unit":"°C"
    }
}
```

FIG. 15A

```
...
"Sensor type":"Room temperature",
"Value":"25.0",
"Unit":"°C"
...
```

FIG. 15B

```
...
"Sensor type":"Room temperature",
"Value":"26.0",
"Unit":"°C"
...
```

FIG. 15C

```
...
"Sensor type":"Room temperature",
"Value":"25.2",
"Unit":"°C"
```

```
...
"Sensor type":"Room temperature",
"Value":"25.4",
"Unit":"°C"
```

```
...
"Sensor type":"Room temperature",
"Value":"25.6",
"Unit":"°C"
```

```
{
    "header":{
        "Manufacturer":"EFG Corporation",
        "Model Name":"EFG56789",
        "Serial Number":"EFG56789005"
    },
    "payload":{
        "Date" :"2018/4/1 12:54:00",
        "Date type":"UTC",
        "Appliance type":"Room Air Conditioner",
        "Power":"On",
        "Mode":"Cool",
        "Fan speed":"Auto",
        "Set temperature":"26.0",
        "Sensor type":"Room temperature",
        "Value":"25.8",
        "Unit":"°C",
        "Resolution" :"1.0",
        "Measurement environment":"10 bit AD converter",
        "Processing":12,
        "Manufacturer":"ZAB Technology",
        "Sensor Model":"ZAB34567",
        "Serial Number":"ZAB34567003"
    }
}
```

SERVER DEVICE, DATA DISTRIBUTION SYSTEM, DATA PROVISION METHOD, AND RECORDING MEDIUM

CROSS REFERENCE TO RELATED APPLICATION

This application is a U.S. national stage application of PCT/JP2018/036322 filed on Sep. 28, 2018, the contents of which are incorporated herein by reference.

TECHNICAL FIELD

The present disclosure relates to a server device, a data distribution system, a data provision method, and a program.

BACKGROUND ART

In recent years, formation of a data distribution market for dealing with device data collected from various devices installed in homes, workplaces, and the like (for example, home appliances, sensor devices and the like) is promoted. In such a data distribution market, an enormous amount of device data is expected to be distributed, and it is desirable to enable a data user to use, from among the enormous amount of device data, device data useful to the data user (for example, device data that has satisfactory validity, satisfactory reliability, and the like). For this purpose, for example, utilizing ancillary information such as acquisition time and precision is conceivable.

For example, Patent Literature 1 discloses a sensor network system utilizing ancillary information (format, specification, attribute, and the like) of a sensor terminal. In this sensor network system, ancillary information of the sensor terminal and sensing data from the sensor terminal are managed, in a database, in association with identification information of the sensor terminal.

CITATION LIST

Patent Literature

Patent Literature 1: International Publication No. WO 2016/157271

SUMMARY OF INVENTION

Technical Problem

However, in Patent Literature 1 described above, in order to search for desired sensing data from the database, ancillary information is merely used as a search condition, and only the sensing data is provided to the user terminal after a search. That is, in Patent Literature 1, only the sensing data is actually distributed, and not merely is the user unable to verify the validity, reliability and the like of the distributed sensing data, but proper use of distributed sensing data cannot be made under existing circumstances, such as use of high-precision sensing data for determination, use of low-precision sensing data for display, and the like.

Accordingly, there is a demand for development of a new technology that (i) allows the user to verify the validity, reliability and the like of the distributed data and (ii) also allows the user to properly use the distributed data.

In consideration of such circumstances, an object of the present disclosure is to provide a server device, a data distribution system, a data provision method, and a program for enabling distribution of data that is more appropriate.

Solution to Problem

In order to attain the aforementioned objective, a server device according to the present disclosure includes (i) collection means for collecting device data obtained from a device, and (ii) provision means for providing, to an outside, distribution data that includes the device data collected by the collection means and ancillary information about the device data.

Advantageous Effects of Invention

According to the present disclosure, the collection means collects, for example, device data obtained from a device installed in a home, a work place or the like, and the provision means provides, to the outside, (for example, to a server of a data user) distribution data including the device data collected by the collection means and ancillary information about the device data, thereby enabling the external user to verify the validity, reliability and the like of the distribution data based on the ancillary information and to properly use the distribution data based on the ancillary information. As a result, data can be distributed that is more appropriate.

BRIEF DESCRIPTION OF DRAWINGS

FIG. 3A is a diagram illustrating one example of device data about the air conditioner;

FIG. 3B is a diagram illustrating one example of ancillary information, that is, device data, about the air conditioner;

FIG. 3C is a diagram illustrating one example of distribution data about the air conditioner, FIG. 4A is a diagram illustrating one example of distribution data about a temperature sensor;

FIG. 4B is a diagram illustrating one example of distribution data about a motion sensor;

FIG. 11 is a diagram illustrating one example of ancillary information stored in an ancillary information database;

FIG. 12 is a diagram illustrating one example of distribution data generated in the data collection server.

FIG. 15A is a diagram illustrating a portion of distribution data acquired five minutes beforehand;

FIG. 15B is a diagram illustrating a portion of distribution data acquired currently;

FIG. 15C is a diagram illustrating one example of distribution data generated by interpolation processing;

DESCRIPTION OF EMBODIMENTS

Embodiments of the present disclosure are described below in detail with reference to drawings. Components that are the same or equivalent are assigned the same reference signs throughout the drawings. A case is described below in which distribution data including device data is collected from a device installed in each house and is provided (distributed) to the outside. However, this case is merely one example, and the present disclosure can be also applied to a case in which distribution data including device data is collected from a device installed in each workplace (offices, factories and the like) or each facility (commercial facilities, schools, hospitals and the like) and provided to the outside. That is, the embodiments described below are for explanation and do not limit the scope of the present disclosure. Accordingly, a person of ordinary skill in the art can employ embodiments in which each or all elements of the below-described embodiments are replaced with equivalents, and such embodiments are also included in the scope of the present disclosure.

Embodiment 1

Figure 1:
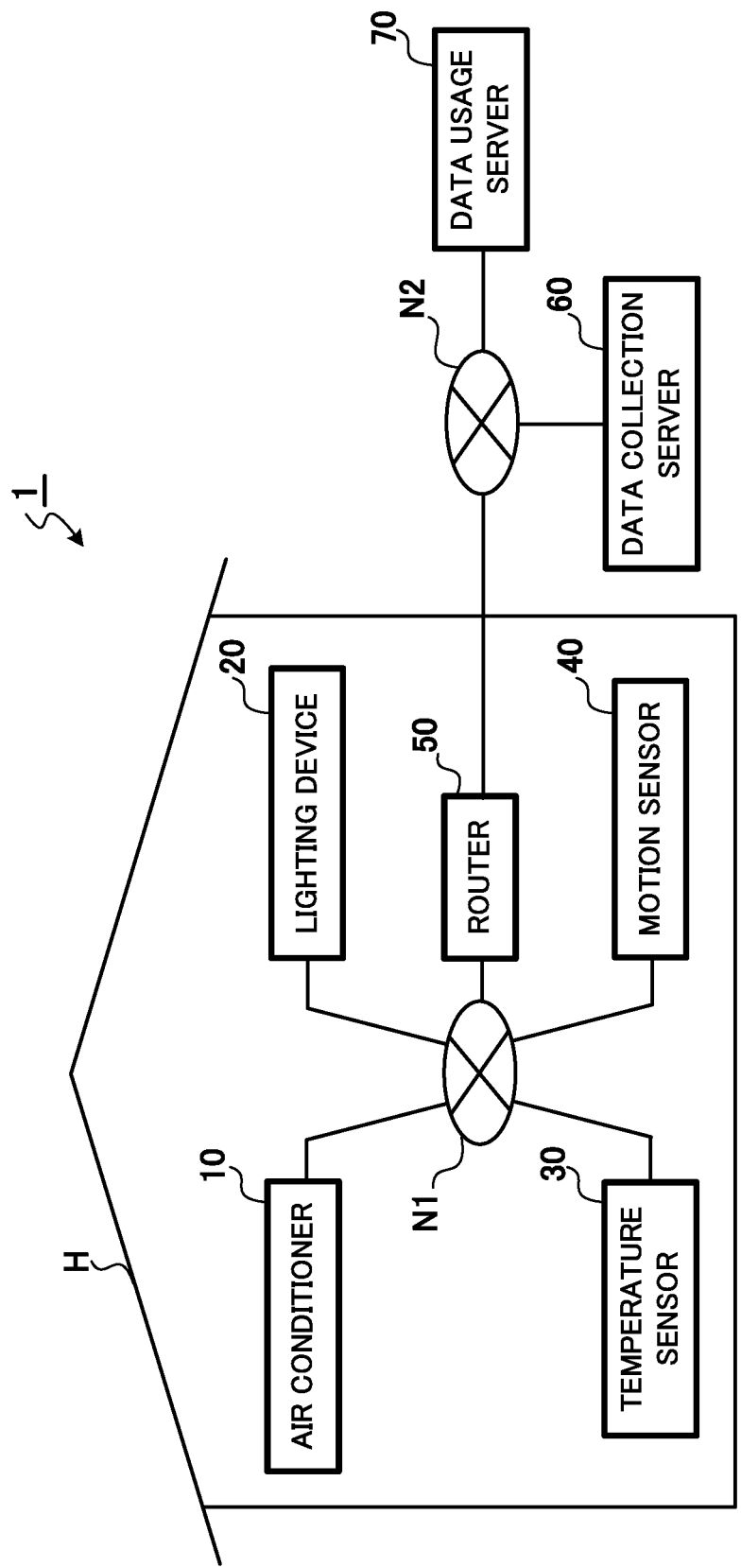
FIG. 1 is a diagram illustrating one example of overall configuration of a data distribution system according to Embodiment 1 of the present disclosure.

FIG. 1 is a diagram illustrating one example of overall configuration of a data distribution system 1 according to Embodiment 1 of the present disclosure. As described later, this data distribution system 1 is a system constructed to deal with (distribute) distribution data including device data and ancillary information. As illustrated in the drawing, the data distribution system 1 includes (i) an air conditioner 10, an lighting device 20, a temperature sensor 30, and a motion sensor 40, which are examples of devices arranged in a house H. (ii) a router 50 for connecting these devices to the Internet N2, (iii) a data collection server 60 for collecting device data (more specifically, distribution data) obtained from these devices, and (iv) a data usage server 70 that uses the distribution data collected by the data collection server 60. The data collection server 60 is one example of a server device. Also, FIG. 1 illustrates a case in which the data collection server 60 and the data usage server 70 are connected via the Internet N2. However, this case is merely an example, and alternatively, the data collection server 60 and the data usage server 70 may be connected via a dedicated network.

The air conditioner 10, the lighting device 20, the temperature sensor 30, and the motion sensor 40 that are arranged in the house H are communicably connected to the router 50 via a wired or wireless home network N1. These devices arranged in the house H are merely examples, and such devices may include a water heater, an induction heating (IH) cooker, a rice cooker, a refrigerator, a dehumidifier, and a ventilation fan. The router 50 may be omitted if the devices such as the air conditioner 10, the lighting device 20, the temperature sensor 30, and the motion sensor 40 can be directly connected to the Internet N2. Also, although only one house H is illustrated in FIG. 1, a huge number of houses are actually included that have a similar configuration to that of the houses H, and each house is connected to the Internet N2.

The air conditioner 10 is, for example, a device that performs an air conditioning operation such as cooling, heating, and dehumidification, thereby conditioning air in the room (in the house H). The air conditioner 10 includes, for example, a temperature measurement unit disposed near an intake port for taking in indoor air and thus can measure indoor temperature.

The lighting device 20 is, for example, a device that illuminates a room by making a light emitting diode (LED) or a fluorescent lamp emit light.

The temperature sensor 30 is, for example, a device provided with a high-precision semiconductor temperature sensor and measures a temperature in a room. As an example, the temperature sensor 30 is configured to be capable of measuring a temperature with higher precision than the above-described air conditioner 10 measures a temperature.

The motion sensor 40 is, for example, a device that detects whether there is a person in a room and detects an amount of movement (a degree of movement) of the person when the person is in the room. As an example, the motion sensor 40 detects the presence or absence of a person in a room by capturing infrared rays emitted by the person or capturing reflection of an ultrasonic wave. Also, the motion sensor 40 detects the amount of movement of the person in the room in accordance with a change in temperature (heat) distribution due to infrared rays or a change in reflection time of the ultrasonic wave.

Figure 2:
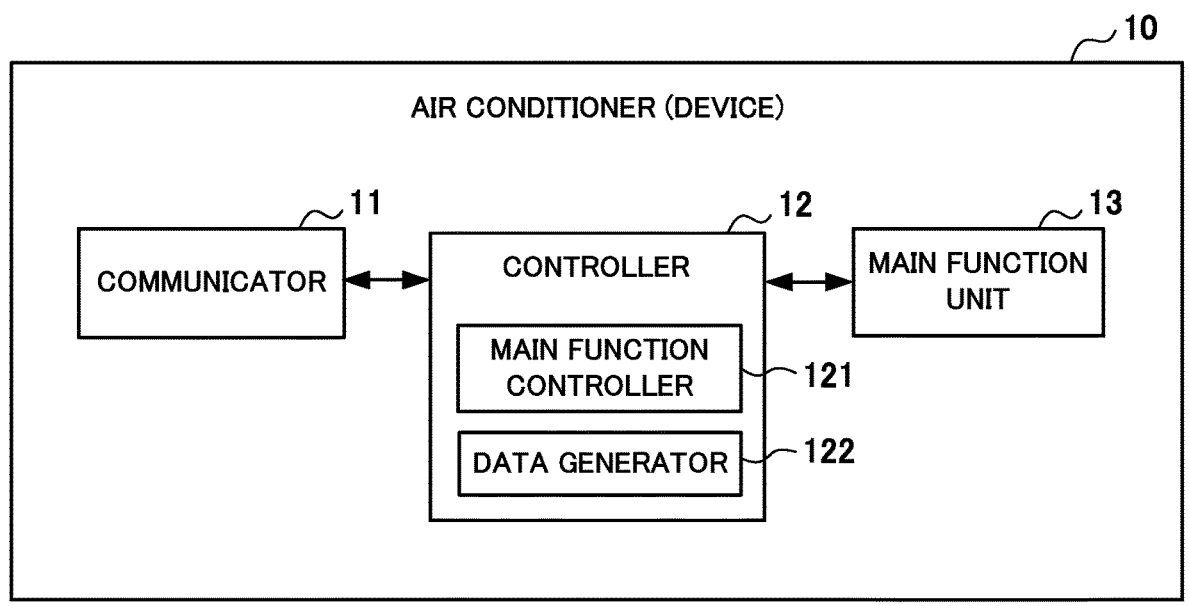
FIG. 2 is a diagram illustrating one example of a configuration of an air conditioner (device) according to Embodiment 1 of the present disclosure.

Concrete configurations of these devices are described with reference to FIG. 2 by taking the air conditioner 10 as an example. FIG. 2 is a block diagram for describing configuration of the air conditioner 10. As illustrated in the drawing, the air conditioner 10 includes a communicator 11 that is one example of transmission means, a controller 12, and a main function unit 13.

The communicator 11 communicates with the router 50 via the home network N1, for example, by wireless communication such as Bluetooth (registered trademark) Low Energy (BLE) or Wi-Fi, or by wired communication such as power line communication (PLC) or Ethernet (registered trademark). More specifically, the communicator 11 communicates with the data collection server 60 through the router 50 and via the Internet N2.

The controller 12 includes, for example, a central processing unit (CPU), a read only memory (ROM), a random access memory (RAM) and the like and controls operation of the air conditioner 10 (device). More specifically, the controller 12 functionally includes a main function controller 121 and a data generator 122. These functions are achieved, for example, by the CPU using the RAM as a working memory and appropriately executing a program stored in the ROM.

The main function controller 121 controls the main function unit 13 in accordance with, for example, an instruction from the user (for example, an operation of a remote control) to perform an air conditioning operation such as cooling, heating, and dehumidification.

The data generator 122 generates distribution data serving as a target for distribution for the data distribution system 1. For example, the data generator 122 generates distribution data in which ancillary information is added to the device data of the air conditioner 10 (device). Hereinafter, these data (information) are specifically described.

The device data is data indicating a state of the air conditioner 10 (device). As an example, as illustrated in FIG. 3A, the device data includes a state of a power supply, a state of an operation mode, a setting state typified by a setting temperature, a detection state typified by a room temperature and the like. The content (items) of the device data varies, as appropriate, in accordance with devices.

Also, the ancillary information is detailed information that should be ancillary to the air conditioner 10 (device) and the device data. The ancillary information is stored in the ROM in advance, and as an example illustrated in FIG. 3B, the ancillary information includes (i) information such as a manufacturer, a model, and a model number of the air conditioner 10 (device) and (ii) information of an acquisition time (date and time), unit, precision, resolution and the like of the device data. As described later, the ancillary information may include the content of processing for the device data.

Also, the data generator 122 adds ancillary information of FIG. 3B to the device data of FIG. 3A to generate distribution data as illustrated in FIG. 3C. Although the distribution data illustrated in FIG. 3C illustrates a case in winch the distribution data is described in a JavaScript (registered trademark) object notation (JSON) format, such a format is merely an example, and the distribution data may be described in another format such as an extensible markup language (XML) format or a comma-separated values (CSV) format.

Referring back to FIG. 2, if a predetermined transmission condition is satisfied (for example, when five minutes elapse since previous transmission if the transmission condition is an interval of five minutes), the data generator 122 generates distribution data as illustrated in FIG. 3C. Also, the data generator 122 transmits the generated distribution data from the communicator 11 to the data collection server 60 (through the router 50). The transmission condition may include a time at which a state of the air conditioner 10 (device) is changed. For example, even when the power supply or the operation mode of the air conditioner 10 is changed by a users instruction, the data generator 122 similarly generates distribution data and transmits the generated distribution data from the communicator 11 to the data collection server 60.

The main function unit 13 is a component for achieving an air conditioning function such as cooling, heating, and dehumidification, and is, for example, a pump for circulating a refrigerant, a compressor for compressing the refrigerant, an expander for expanding the refrigerant, a fan motor for blowing air, or the like. If the main function unit 13 is another device, the main function unit 13 has a configuration for achieving a function corresponding to the other device. That is, in the case of the lighting device 20, the main function unit 13 is, for example, a light emitting diode (LED), a fluorescent lamp, a peripheral circuit thereof, or the like. Also, in the case of the temperature sensor 30, the main function unit 13 is, for example, a high-precision semiconductor temperature sensor, a peripheral circuit thereof, or the like. In the case of the motion sensor 40, the main function unit 13 is, for example, a pyroelectric infrared sensor, a peripheral circuit thereof, or the like.

Devices such as the lighting device 20, the temperature sensor 30 also have configurations similar to such a configuration as illustrated in FIG. 2, and the motion sensor 40. That is, although the main function unit 13 varies depending on the devices, the data generator 122 generates distribution data in a manner similar to the manner described above. For example, in the case in which the main function unit 13 is the temperature sensor 30, the data generator 122 generates distribution data as illustrated in FIG. 4A. Also, in the case in which the main function unit 13 is the motion sensor 40, the data generator 122 generates distribution data as illustrated in FIG. 4B. The distribution data is also transmitted from the above-described devices (the temperature sensor 30, the motion sensor 40, and the like) to the data collection server 60.

Referring back to FIG. 1, the router 50 is a communication device that relays communication between the home network N1 and the Internet N2. The router 50 may be omitted if the above-described devices such as the air conditioner 10, the lighting device 20, the temperature sensor 30, and the motion sensor 40 can be directly connected to the Internet N2.

The data collection server 60 is, for example, a server constructed by a device maker (for example, an on-premises server), a public cloud constructed by a cloud vendor, or the like. The distribution data collected from a device (the air conditioner 10, the lighting device 20, the temperature sensor 30, the motion sensor 40, or the like) of each home (each house H) is provided (distributed) to the outside.

Figure 5:
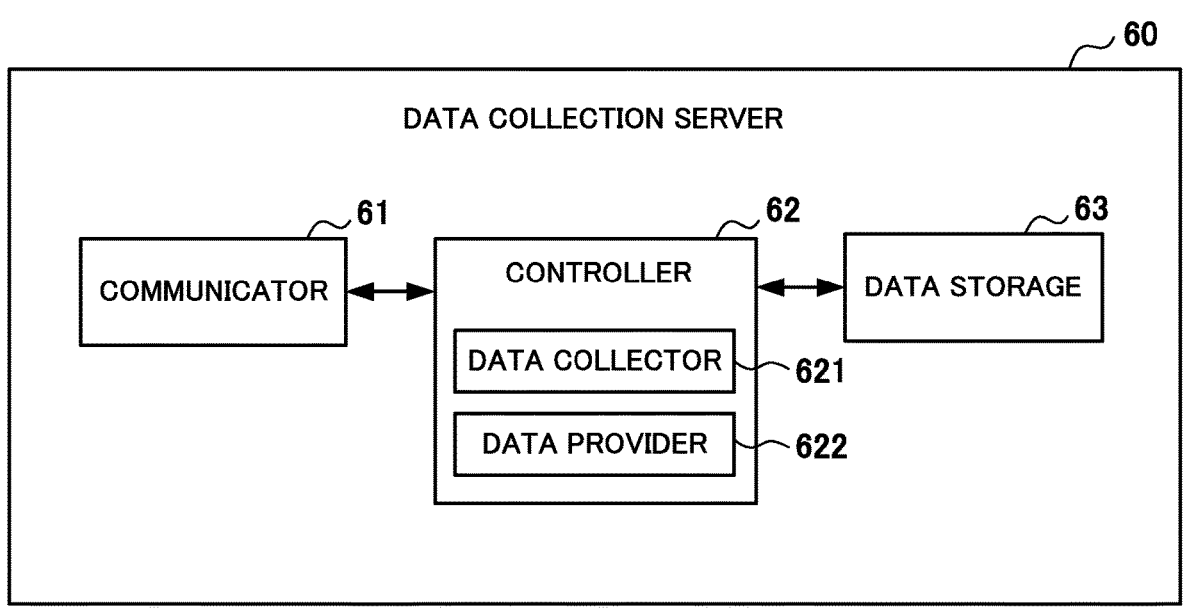
FIG. 5 is a block diagram illustrating one example of a configuration of a data collection server according to Embodiment 1 of the present disclosure.

A specific configuration of the data collection server 60 is described with reference to FIG. 5. FIG. 5 is a block diagram for explaining the configuration of the data collection server 60. As illustrated in the drawing, the data collection server 60 includes a communicator 61, a controller 62, and a data storage 63 that is an example of accumulation means.

The communicator 61 is, for example, a network interface capable of communicating with the above-described devices (the air conditioner 10, the lighting device 20, the temperature sensor 30, the motion sensor 40, and the like) and the data usage server 70 via the Internet N2. The communicator 61 performs communication with the data usage server 70 based on a standardized Web application programming interface (Web API). That is, the distribution data provided from the data collection server 60 to the data usage server 70 is delivered in a data format (for example, JSON format) corresponding to the Web API.

The controller 62 is equipped with, for example, a CPU, a ROM, a RAM and the like, and controls operation of the data collection server 60. More specifically, the controller 62 functionally includes (i) a data collector 621 that is one example of data collection means, and (ii) a data provider 622 that is one example of provision means. These functions are achieved, for example, by the CPU using the RAM as a working memory and appropriately executing a program stored in the ROM.

The data collector 621 collects distribution data from devices such as the air conditioner 10, the lighting device 20, the temperature sensor 30, and the motion sensor 40. That is, the data collector 621 controls the communicator 61 to receive the distribution data sent from the devices and store the received distribution data in the data storage 63.

The data provider 622 provides corresponding distribution data to the data usage server 70 in response to a request from the data usage server 70. For example, when specific content (item) of the ancillary information is specified, the data provider 622 extracts (reads) distribution data including the corresponding ancillary information from the distribution data stored in the data storage 63. Also, the data provider 622 controls the communicator 61 to transmit the extracted distribution data to the data usage server 70.

Figure 6:
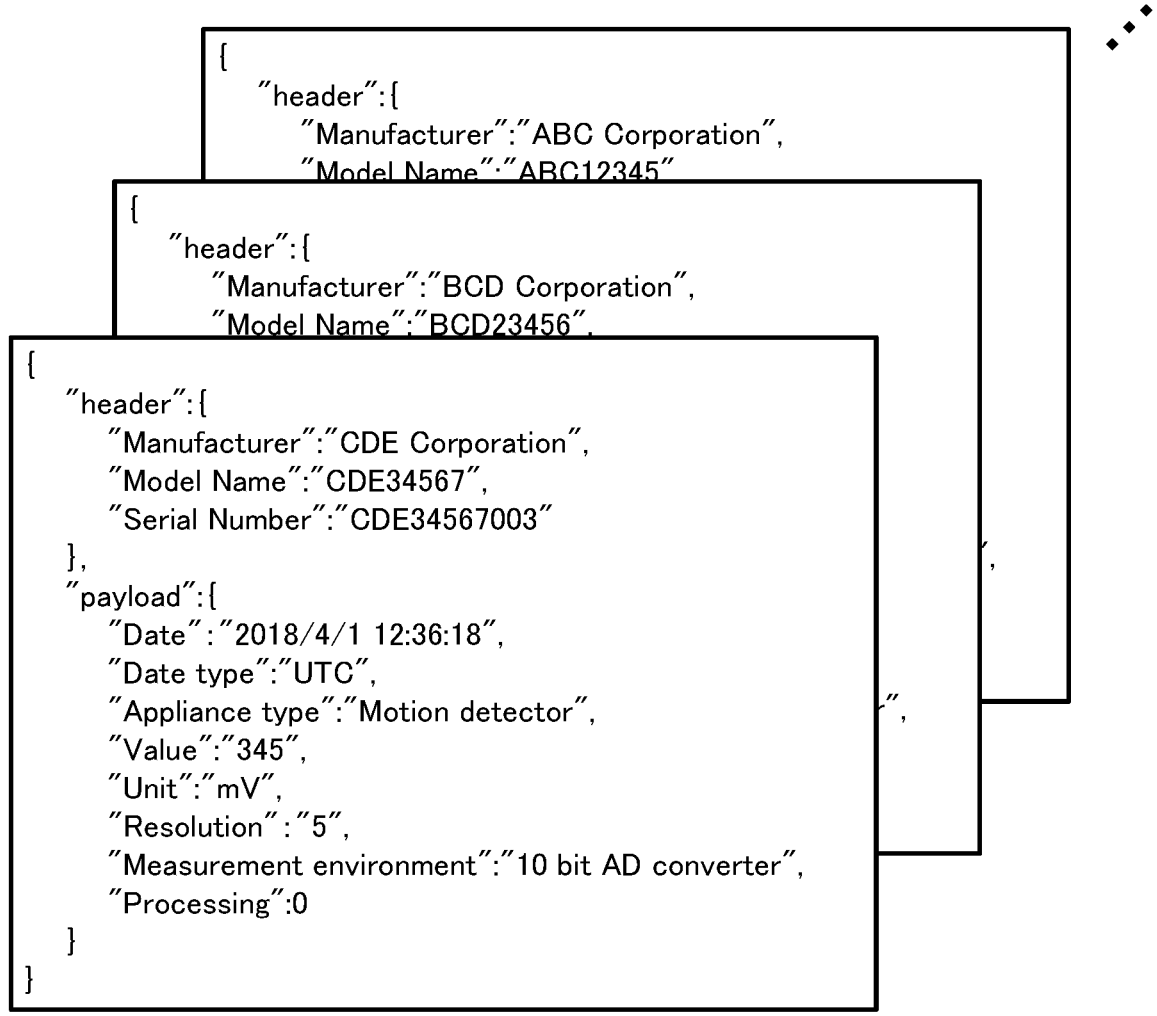
FIG. 6 is a diagram illustrating one example of the distribution data stored in a data storage.

The data storage 63 accumulates the distribution data collected by the data collector 621. That is, as illustrated in FIG. 6, the data storage 63 stores a huge number of distribution data items (distribution data group) collected from each house.

Referring back to FIG. 1, the data usage server 70 is, for example, a server constructed by a servicer using distribution data (for example, an on-premises server) or a public cloud constructed by a cloud vendor and provides various services using the distribution data provided from the data collection server 60.

Figure 7:
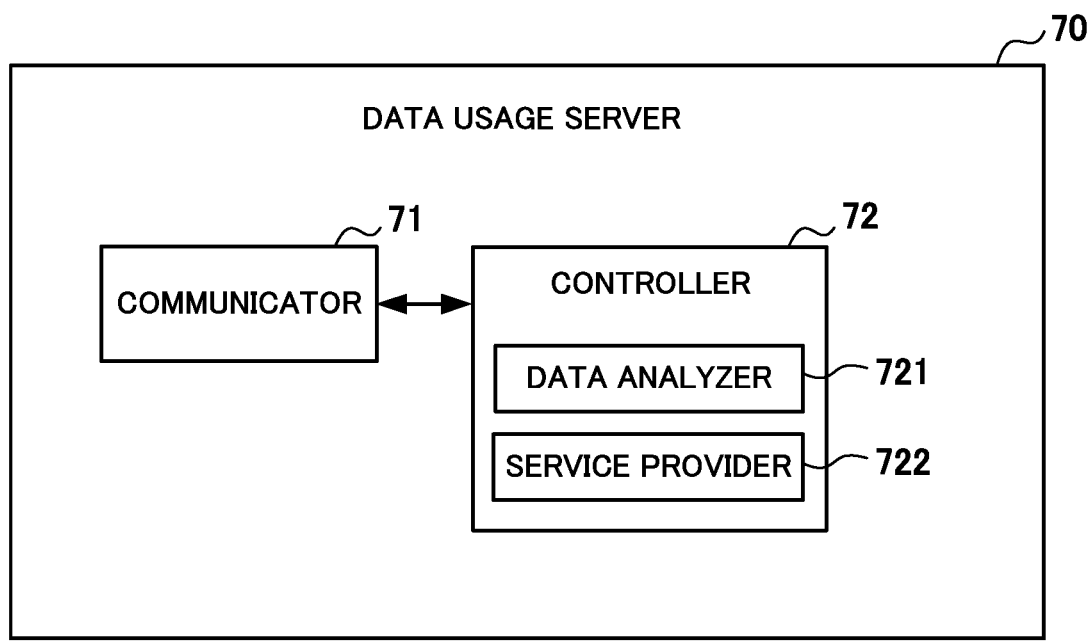
FIG. 7 is a block diagram illustrating one example of a configuration of a data usage server according to Embodiment 1 of the present disclosure.

A specific configuration of the data usage server 70 is described with reference to FIG. 7. FIG. 7 is a block diagram for explaining the configuration of the data usage server 70. As illustrated in the drawing, the data usage server 70 is equipped with a communicator 71 and a controller 72. The data usage server 70 may further be equipped with a data storage that stores the distribution data provided from the data collection server 60.

The communicator 71 is, for example, a network interface capable of communicating with the data collection server 60 via the Internet N2. The communicator 71 performs communication with the data collection server 60 based on the standardized Web API. That is, the data usage server 70 receives the distribution data transmitted from the data collection server 60 in a data format corresponding to the Web API (for example, JSON format).

The controller 72 includes, for example, a CPU, a ROM, and a RAM and controls operation of the data usage server 70. More specifically, the controller 72 functionally includes a data analyzer 721 and a service provider 722 that is an example of service provision means. These functions are achieved, for example, by the CPU using the RAM as a working memory and appropriately executing a program stored in the ROM.

The data analyzer 721 analyzes the distribution data provided from the data collection server 60. For example, in a case in which the data usage server 70 provides a watching-over service (for example, a service for checking safety of a parent whose household is far away), the data analyzer 721 analyzes distribution data of a home (house H) to be watched over and then determines whether there is any abnormality in the home. More specifically, as one example, a case is described in which devices such as the air conditioner 10 and the motion sensor 40 are placed in the home to be watched over and distribution data about those devices is provided from the data collection server 60. In this case, when (i) the power of the air conditioner 10 is in the turned-on state in the above-described distribution data of the air conditioner 10 illustrated in FIG. 3C and (ii) a state in which there is "no detection" by the motion sensor 40 (for example, a state in which the value of the device data is 10 mV or less) continues for a certain period of time (for example, 30 minutes) in the above-described distribution data of the motion sensor 40 illustrated in FIG. 4B (a plurality of distribution data values in a time series), the data analyzer 721 determines that there is abnormality. At this time, when the data analyzer 721 determines that the precision of the motion sensor 40 is lower than a reference from the ancillary information of the distribution data illustrated in FIG. 4B, for example, the data analyzer 721 may extend the above-described certain time from 30 minutes to 45 minutes to make determination of the existence of the abnormality. That is, the data analyzer 721 appropriately changes the method of detecting the abnormality in accordance with the ancillary information included in the distribution data.

The service provider 722 provides necessary information for the user in accordance with a result of the analysis (determination) of the data analyzer 721. For example, in a case in which the data usage server 70 provides the watching-over service, the service provider 722 transmits an email to an address of the registered user (for example, a relative of a person to be watched over) when the data analyzer 721 determines that there is abnormality, thereby giving notice of occurrence of the abnormality. The use of an email is merely one example, and, alternatively, the service provider 722 may transmit a message to a social networking service (SNS) account of the registered user to give notice of occurrence of abnormality.

Figure 8:
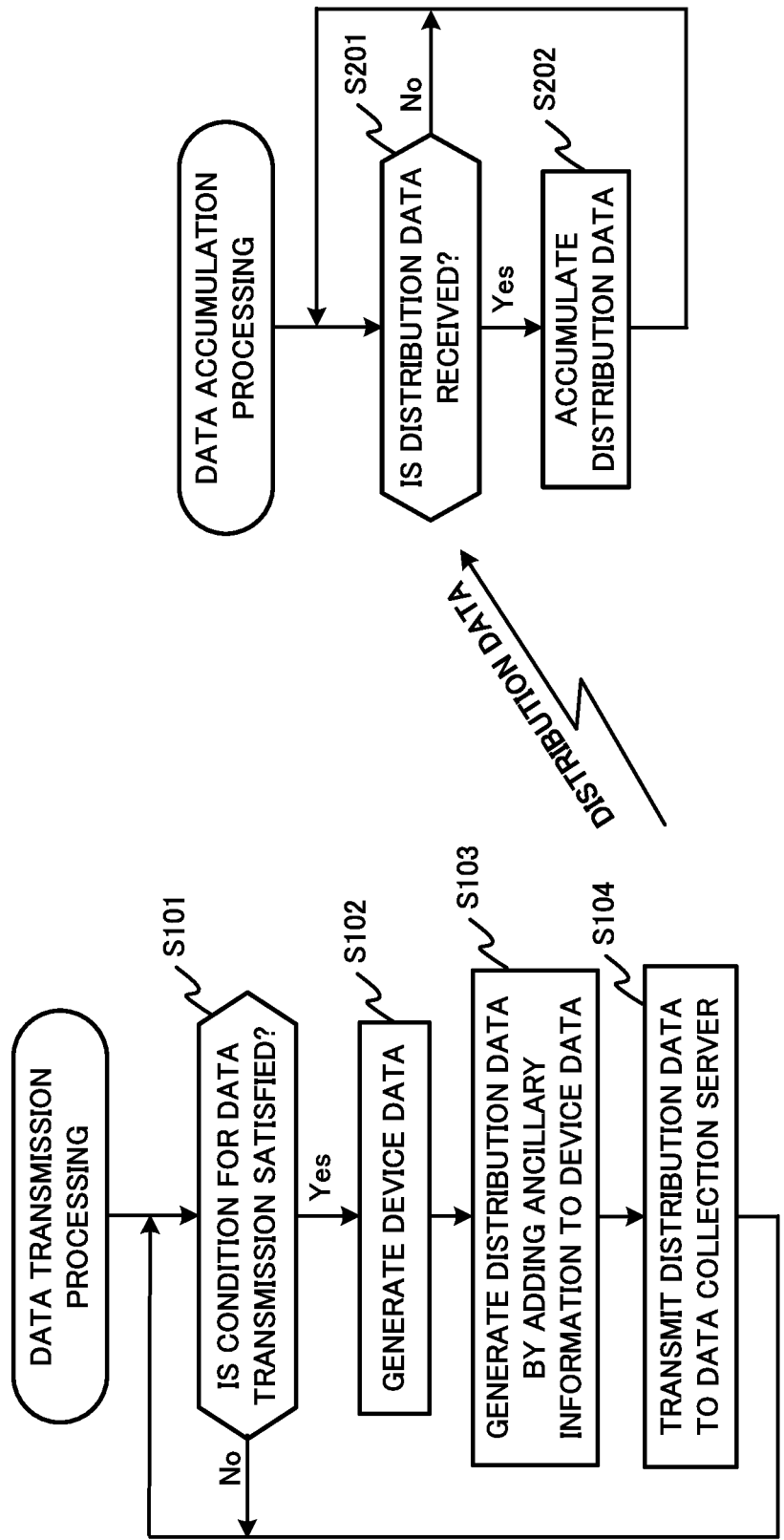
FIG. 8 is a flow chart illustrating one example of data transmission processing performed by the device and one example of data accumulation processing performed by the data collection server.
Figure 9:
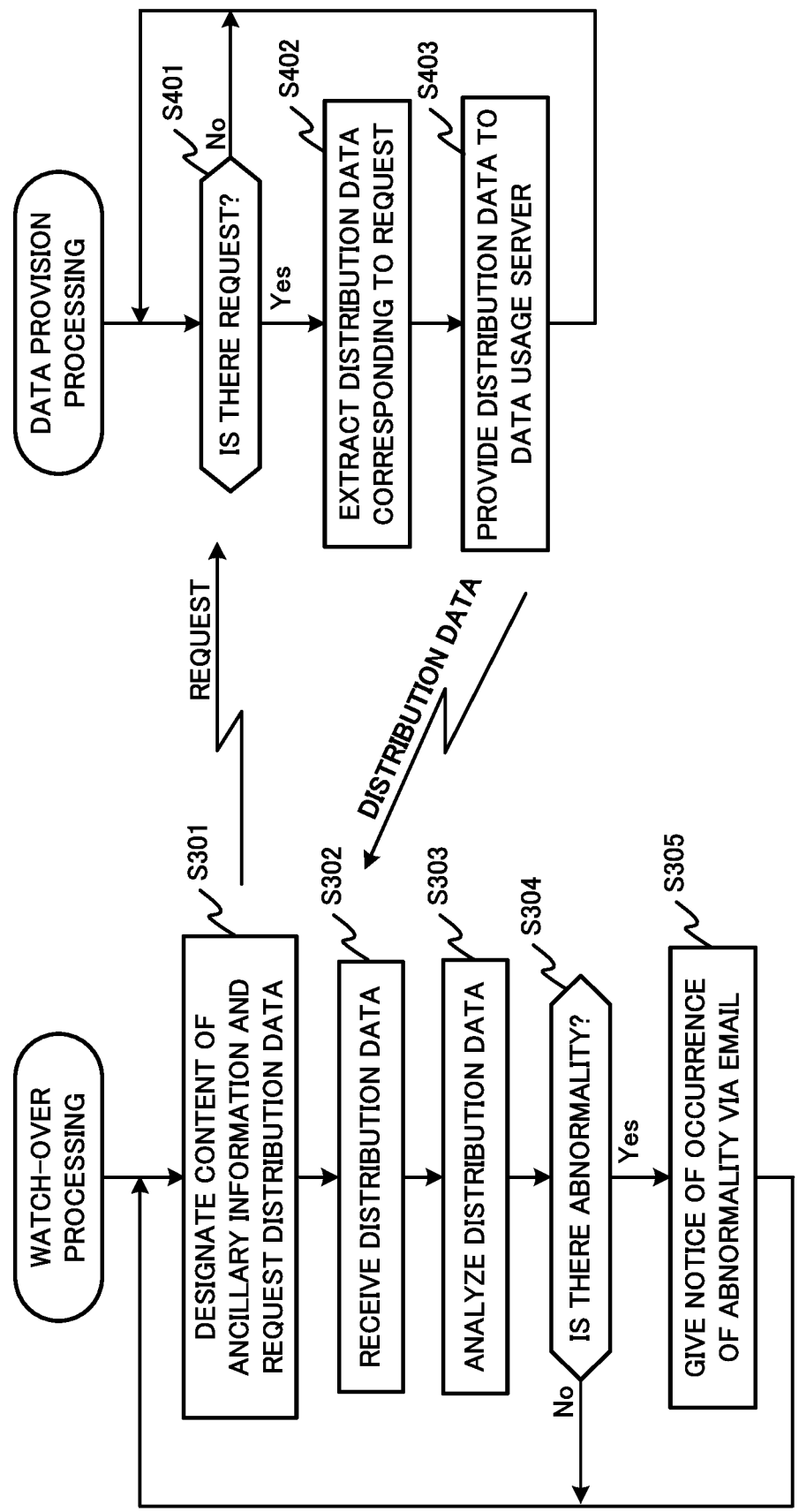
FIG. 9 is a flow chart illustrating one example of watch-over processing performed by the data usage server and one example of data provision processing performed by the data collection server.

Hereinafter, operation of the data distribution system 1 having such a configuration is described with reference to FIGS. 8 and 9. FIG. 8 is a flowchart illustrating (i) one example of data transmission processing performed by a device such as the air conditioner 10, the lighting device 20, the temperature sensor 30, or the motion sensor 40, and (ii) one example of data accumulation processing performed by the data collection server 60. Also, FIG. 9 is a flowchart illustrating one example of watch-over processing performed by the data usage server 70 and one example of data provision processing performed by the data collection server 60.

First, the data transmission processing in the device and the data accumulation processing in the data collection server 60 are described with reference to FIG. 8. These data transmission processing and data accumulation processing are repeatedly executed in the device and the data collection server 60.

First, the device determines whether the data transmission condition is satisfied (step S101). For example, if the transmission condition is an interval of five minutes, the data generator 122 of the air conditioner 10 determines whether five minutes are elapsed since the previous transmission. The transmission condition may include a time at which the state of the air conditioner 10 is changed. In this case, the data generator 122 also determines whether the power supply or the operation mode of the air conditioner 10 is changed.

When the device determines that the data transmission condition is not satisfied (No in step S101), the device stands by until the transmission condition is satisfied.

On the other hand, if the data transmission condition is determined to be satisfied (Yes in step S101), the devices generate device data (step S102). For example, the data generator 122 of the air conditioner 10 generates device data as illustrated in FIG. 3A in accordance with the state of the air conditioner 10.

The device adds ancillary information to the device data to generate distribution data (step S103). For example, the data generator 122 of the air conditioner 10 adds ancillary information of FIG. 3B to the device data of FIG. 3A to generate distribution data as illustrated in FIG. 3C. Although the distribution data illustrated in FIG. 3C is described in JSON format, such a format data is merely one example, and the distribution data may be described in another format such as XML format or CSV format.

The device transmits the generated distribution data to the data collection server 60 (Step S104). For example, the communicator 11 of the air conditioner 10 transmits, to the data collection server 60 through the router 50, the distribution data as illustrated in FIG. 3C that is generated in step S103. If the device is the temperature sensor 30, the distribution data as illustrated in FIG. 4A is transmitted to the data collection server 60. Also, if the device is the motion sensor 40, the distribution data as illustrated in FIG. 4B is transmitted to the data collection server 60.

On the other hand, the data collection server 60 determines whether the distribution data is received (step S201). That is, the data collector 621 determines whether the communicator 61 receives the distribution data transmitted from the device.

When the data collection server 60 determines that distribution data is not received (No in step S201), the data collection server 60 stands by until distribution data is received.

On the other hand, if the distribution data is determined to be received (Yes in step S201), the data collection server 60 accumulates the received distribution data (step S202). That is, the data collector 621 stores the received distribution data in the data storage 63.

Next, the watch-over processing in the data usage server 70 and the data provision processing in the data collection server 60 are described with reference to FIG. 9. These watch-over processing and data provision processing are repeatedly executed in the data usage server 70 and the data collection server 60.

First, the data usage server 70 designates the contents of the ancillary information to request distribution data (step S301). For example, the data usage server 70 requests the distribution data from the data collection server 60 while specifying specific information (for example, a serial number) of the air conditioner 10 and the motion sensor 40 that are placed in the home (house H) to be watched over.

On the other hand, the data collection server 60 determines whether there is a request (step S401). That is, the data provider 622 determines whether the communicator 61 receives the request transmitted from the data usage server 70 (the request in which the content of the ancillary information is specified).

When the data collection server 60 determines that there is no request (No in step S401), the data collection server 60 stands by until there is a request.

On the other hand, if a request is determined to be made (Yes in step S401), the data collection server 60 extracts distribution data corresponding to the request (step S402). That is, the data provider 622 reads, from the data storage 63, distribution data including ancillary information that matches the information (for example, a serial number) unique to the designated device.

The data collection server 60 provides the distribution data to the data usage server 70 (Step S403). That is, the data provider 622 controls the communicator 61 to transmit the extracted distribution data to the data usage server 70.

The data usage server 70 receives the distribution data provided from the data collection server 60 (Step S302).

The data usage server 70 analyzes the received distribution data (step S303). That is, the data analyzer 721 analyzes the distribution data to determine whether there is abnormality. For example, in a case in which (i) in the distribution data of the air conditioner 10 illustrated in FIG. 3C, the air conditioner 10 is in the power-on state and (ii) in the distribution data of the motion sensor 40 illustrated in FIG. 4B (plurality of distribution data values in a time series), a state in which there is "no detection" by the motion sensor 40 (for example, a state where a value of the motion sensor 40 is 10 mV or less) continues for a certain period of time (for example, 30 minutes), the data analyzer 721 determines that there is abnormality. In this case, when the data analyzer 721 determines, from the ancillary information of the distribution data illustrated in FIG. 4B, that the precision of the motion sensor 40 is lower than the reference, for example, the data analyzer 721 may extend the above-described certain period from 30 minutes to 45 minutes to determine the abnormality.

The data usage server 70 determines, based on a result of the analysis in step S303, whether there is abnormality in the home to be watched over (step S304). Upon determining that there is no abnormality (No in step S304), the data usage server 70 returns the processing to step S301 described above.

On the other hand, when it is determined that there is an abnormality (Yes in step S304), the data usage server 70 gives notice of occurrence of the abnormality by an email (step S305). That is, the service provider 722 sends an e-mail to the address of the registered user (for example, a relative of a person to be watched over) to give notice of the occurrence of the abnormality.

By such processing illustrated in FIG. 8, the distribution data including the device data and the ancillary information is accumulated in the data collection server 60, and by the processing illustrated in FIG. 9, useful distribution data can be used. That is, the user can verify the validity, reliability, and the like of the distribution data based on the ancillary information. Also, the user can properly use the distribution data based on the ancillary information. That is, since the ancillary information is added to the distribution data, the user can easily process or easily make proper use of the distribution data (device data). For example, when calculating device data (for example, temperature data) included in distribution data acquired from different installation locations, significant figures may be appropriately determined in accordance with precision or resolution, or high-precision device data can be used for the determination, and conversely, low-precision device data can be used only for displaying such device data. Also, even in a case in which the device includes a plurality of sensors different in precision for measuring the same physical quantity, since the ancillary information is added to the distribution data, the user can appropriately determine, in accordance with circumstances, which of the physical quantities measured by the sensors is to be used. In that case, by the determination in accordance with circumstances, only useful distribution data can be used, and data traffic can be also optimized. Also, the data usage server 70 can provide various services in addition to the above-described watch-over processing. That is, the data usage server 70 can use the ancillary information included in the distribution data provided from the data collection server 60 to build an algorithm optimized in accordance with the service, thereby enabling the provision of various types of services.

As a result, data that is more appropriate can be distributed in the data distribution system 1 according to Embodiment 1 of the present disclosure.

In Embodiment 1, the case is described in which the data collection server 60 provides distribution data in response to a request from the data usage server 70. However, in response to collection of corresponding distribution data by the data collection server 60, the distribution data may be provided from the data collection server 60 to the data usage server 70 without waiting for the request.

In Embodiment 1 described above, the case is described in which the distribution data is generated on the device side such as the air conditioner 10, the lighting device 20, the temperature sensor 30, and the motion sensor 40. However, the device data may be transmitted from the device as it is, and distribution data may be generated on the data collection server 60-side. Hereinafter, Embodiment 2 is described that is characterized in that distribution data is generated on the data collection server 60 side.

Embodiment 2

Configuration of the overall data distribution system 1 according to Embodiment 2 of the present disclosure is similar to the configuration illustrated in FIG. 1 described above. Also, the configurations of the devices such as the air conditioner 10, the lighting device 20, the temperature sensor 30, and the motion sensor 40 are the same as the configurations illustrated in FIG. 2. In Embodiment 2, the data generator 122 is configured only as far as the generation of the device data. The configuration of the data usage server 70 is the same as the above-described configuration illustrated in FIG. 7.

Figure 10:
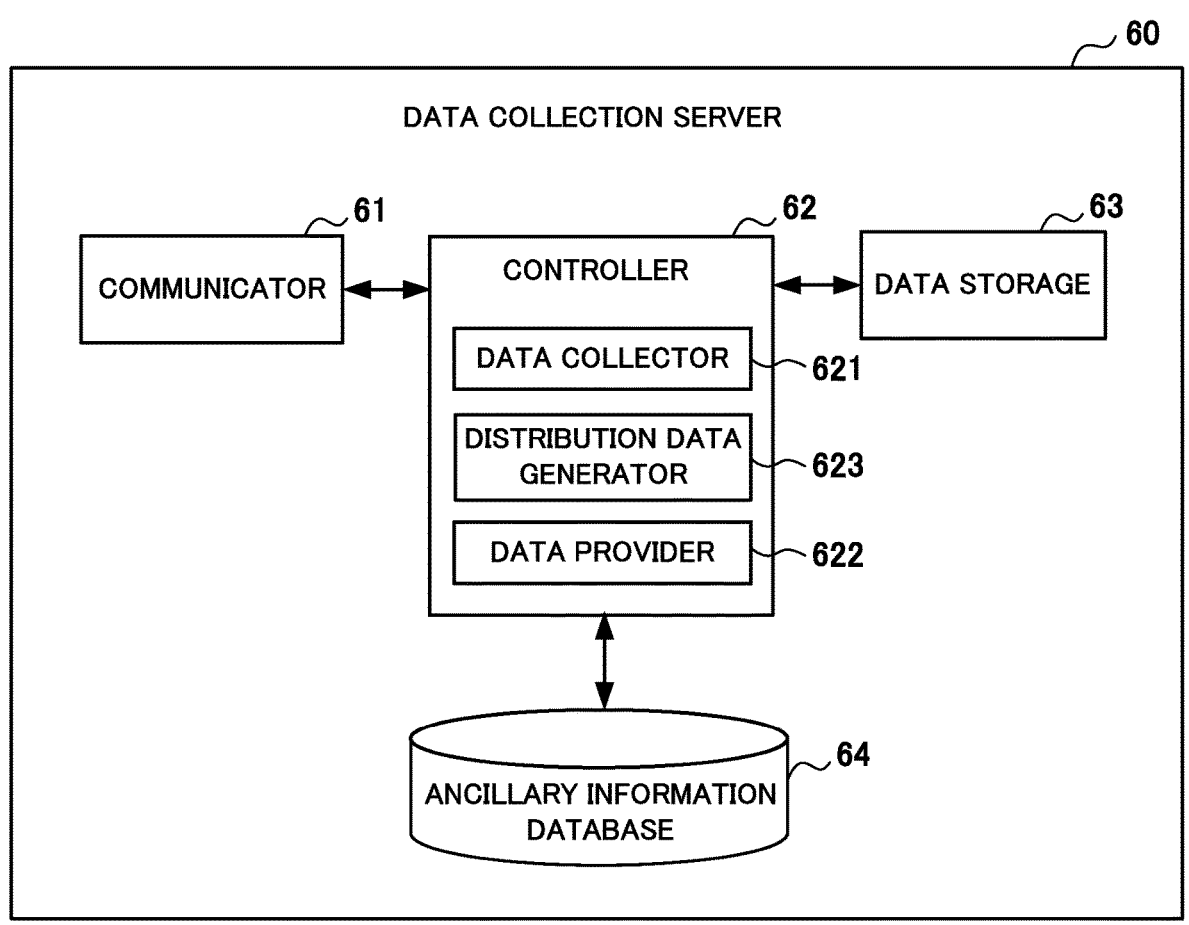
FIG. 10 is a block diagram illustrating one example of a configuration of a data collection server according to Embodiment 2 of the present disclosure.

FIG. 10 is a block diagram for explaining the configuration of the data collection server 60 according to Embodiment 2 of the present disclosure. As illustrated in the drawing, the data collection server 60 includes a communicator 61, a controller 62, a data storage 63 that is an example of accumulation means, and an ancillary information database 64. The controller 62 further includes a distribution data generator 623 that is one example of distribution data generation means. That is, the configuration of the data collection server 60 illustrated in FIG. 10 is different from the above-described data collection server 60 of FIG. 5 in that the configuration illustrated in FIG. 10 further includes the distribution data generator 623 and the ancillary information database 64.

The ancillary information database 64 is a database that stores ancillary information corresponding to a device (for example, device ID) such as the air conditioner 10, the lighting device 20, the temperature sensor 30, or the motion sensor 40. For example, the ancillary information database 64 stores ancillary information corresponding to the manufacturer, model number and the like, as illustrated in FIG. 11. Such additional information stored in the ancillary information database 64 has only the bare minimum content (items), for example, only the manufacturer, model number, and serial number.

Also, in the controller 62, the data collector 621 collects device data from the device such as the air conditioner 10, the lighting device 20, the temperature sensor 30, or the motion sensor 40. That is, the data collector 621 collects only the above-described device data as illustrated in FIG. 3A.

Also, the distribution data generator 623 acquires, from the ancillary information database 64, the ancillary information corresponding to the device data collected by the data collector 621 and adds the ancillary information to the device data to generate distribution data as illustrated in FIG. 12. Although the distribution data illustrated in FIG. 12 is described in JSON format, such a format is merely one example, and the data distribution may be described in another format such as XML format or CSV format. The distribution data generator 623 stores the generated distribution data in the data storage 63.

Also, as described above, the data provider 622 provides the corresponding distribution data to the data usage server 70 in response to a request from the data usage server 70.

Figure 13:
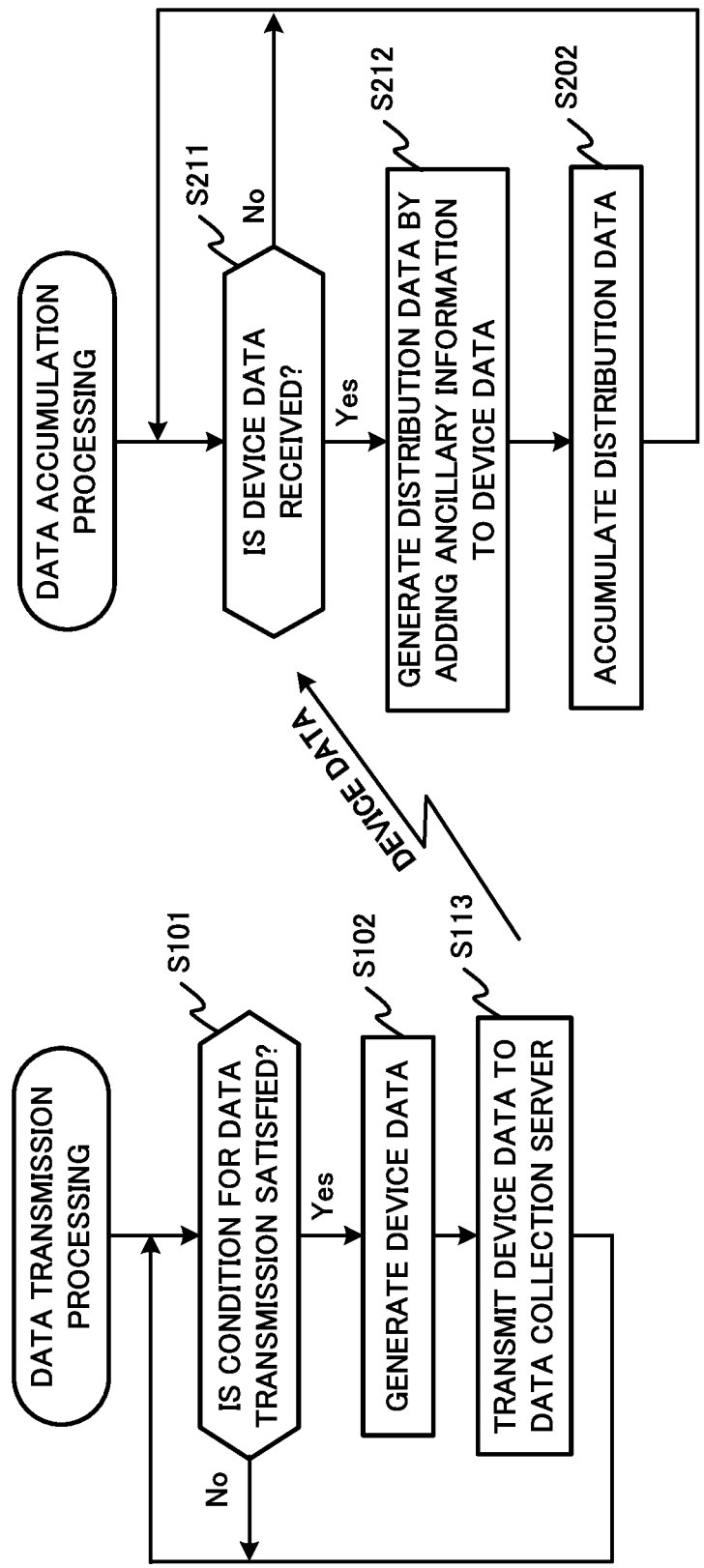
FIG. 13 is a flow chart illustrating one example of data transmission processing performed by the device and one example of data accumulation processing performed by the data collection server.

Hereinafter, an operation of the data distribution system 1 according to Embodiment 2 is described with reference to FIG. 13. FIG. 13 is a flowchart illustrating one example of data transmission processing performed by the device such as the air conditioner 10, the lighting device 20, the temperature sensor 30, or the motion sensor 40, and data accumulation processing performed by the data collection server 60. In FIG. 13, the same reference numerals are assigned to the same processing content as the above-described processing in FIG. 8.

First, the device determines whether the data transmission condition is satisfied (step S101). When the device determines that the data transmission condition is not satisfied (No in step S101), the device stands by until the transmission condition is satisfied.

On the other hand, if the data transmission condition is determined to be satisfied (Yes in step S101), the device generates device data (step S102). For example, the data generator 122 of the air conditioner 10 generates device data as illustrated in FIG. 3A in accordance with a state of the air conditioner 10. The device data is assumed to also include a device ID for identifying the device.

The device transmits the generated device data to the data collection server 60 (Step S113). For example, the communicator 11 of the air conditioner 10 transmits, to the data collection server 60 via the router 50, the device data generated in step S102.

On the other hand, the data collection server 60 determines whether the device data is received (step S211). That is, the data collector 621 determines whether the communicator 61 receives the device data transmitted from the device.

Upon determining that the device data is not received (No in step S211), the data collection server 60 stands by until the device data is received.

On the other hand, when the device data is determined to be received (Yes in step S211), the data collection server 60 adds the ancillary information to the device data to generate distribution data (step S212). That is, the distribution data generator 623 acquires, from the ancillary information database 64, the ancillary information corresponding to the device data received in step S211 and adds the ancillary information to the device data to generate distribution data as illustrated in FIG. 12. Although the distribution data illustrated in FIG. 12 is described in JSON format, such a format is merely one example, and the distribution data may be described in another format such as XML format or CSV format.

The data collection server 60 accumulates the distribution data (step S202). That is, the data collector 621 stores the distribution data generated in step S212 in the data storage 63.

By such processing illustrated in FIG. 13, the distribution data including the device data and the ancillary information accumulate in the data collection server 60. At this time, the device only transmits the device data to the data collection server 60, thereby enabling a reduction of processing load, data traffic and the like. Additionally, the data distribution system 1 according to Embodiment 2 can also use useful distribution data by performing the above-described processing illustrated in FIG. 9. That is, the user can verify the validity, reliability and the like of the distribution data based on the ancillary information. Also, the user can properly use the distribution data based on the ancillary information. That is, since the ancillary information is added to the distribution data, the user can easily process or make proper use of the distribution data (device data). For example, when calculating device data (for example, temperature data) included in distribution data acquired from different installation locations, significant figures may be appropriately determined in accordance with precision or resolution, or high-precision device data can be used for the determination, and conversely, the low-precision device data can be used only for displaying such device data. Also, even in a case in which the device includes a plurality of sensors different in precision in order to measure the same physical quantity, since the ancillary information is added to the distribution data, the user can appropriately determine, in accordance with circumstances, which of the physical quantities measured by the sensors is appropriate for use. In that case, by the determination in accordance with circumstances, only useful distribution data can be used, and the data traffic can be also optimized. Also, the data usage server 70 can provide various services in addition to the above-described watch-over processing. That is, the data usage server 70 can provide various types of services by using the ancillary information included in the distribution data provided from the data collection server 60 and building an algorithm optimized in accordance with the service.

As a result, more appropriate data can be distributed in the data distribution system 1 according to Embodiment 2 of the present disclosure.

In Embodiments 1 and 2, the case is described in which the data collection server 60 only accumulates (i) the distribution data collected from the device such as the air conditioner 10, the lighting device 20, the temperature sensor 30, or the motion sensor 40, or (ii) the distribution data generated on the data collection server 60 side. However, new distribution data may be generated and accumulated based on a plurality of accumulated distribution data values. Hereinafter, Embodiment 3 is described that is characterized in that new distribution data is generated on the data collection server 60 side.

Embodiment 3

Overall configuration of a data distribution system 1 according to Embodiment 3 of the present disclosure is the same to the above-described configuration illustrated in FIG. 1. Also, the configurations of the devices such as the air conditioner 10, the lighting device 20, the temperature sensor 30, and the motion sensor 40 are the same as the above-described configurations illustrated in FIG. 2. In Embodiment 3, the data generator 122 is configured to generate the distribution data as in Embodiment 1. Also, the configuration of the data usage server 70 is the same as the above-described configuration illustrated in FIG. 7.

Figure 14:
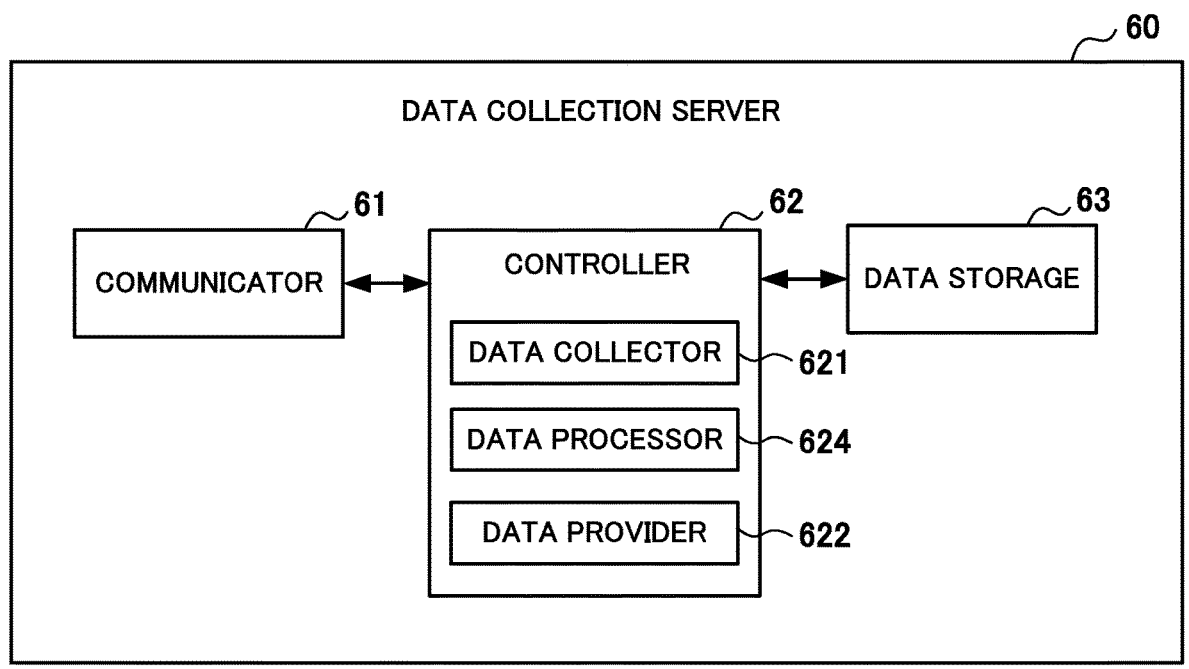
FIG. 14 is a block diagram illustrating one example of a configuration of a data collection server according to Embodiment 3 of the present disclosure.

FIG. 14 is a block diagram for explaining the configuration of the data collection server 60 according to Embodiment 3 of the present disclosure. As illustrated in the drawing, the data collection server 60 is equipped with a communicator 61, a controller 62, and a data storage 63 that is one example of accumulation means. Also, the controller 62 further includes a data processor 624 as one example of distribution data processing means, in addition to the configuration of the controller 62 illustrated in FIG. 5.

In the controller 62, the data collector 621 collects distribution data from the device such as the air conditioner 10, the lighting device 20, the temperature sensor 30, or the motion sensor 40. That is, the data collector 621 collects the above-described distribution data as illustrated in FIGS. 3C and 4A and stores the distribution data in the data storage 63. A case is described below in which the distribution data of the air conditioner 10 illustrated in FIG. 3C is collected, for example, at five-minute intervals, and the distribution data of the temperature sensor 30 illustrated in FIG. 4A is collected, for example, at one-minute intervals.

The data processor 624 processes distribution data collected by the data collector 621 to generate new distribution data. For example, the distribution data of the air conditioner 10 collected at 5-minute intervals is linearly interpolated to generate distribution data at 1-minute intervals to fill gaps. Specifically, the data processor 624 linearly interpolates the distribution data at a time five minutes ago as illustrated in FIG. 15A (a portion of the distribution data of the air conditioner 10 that is acquired five minutes ago) and the distribution data at the present time as illustrated in FIG. 15B (a portion of the distribution data of the air conditioner 10 that is acquired at the present time) to generate the distribution data at a time four minutes ago, at a time three minutes ago, at a time two minutes ago, and at a time one minute ago. Specifically, since the room temperature in the distribution data at the time five minutes ago illustrated in FIG. 15A is 25° C. and the room temperature in the distribution data at the present time that is illustrated in FIG. 15B is 26° C., the data processor 624 generates, as illustrated in FIG. 15C, distribution data obtained by setting the room temperature at the time four minutes ago to 25.2° C., setting the room temperature at the time three minutes ago to 25.4° C., setting the room temperature at the time two minutes ago to 25.6° C. and setting the room temperature at the time one minute ago to 25.8° C. At this time, the data processor 624 sets precision (resolution) to "1.0" in the distribution data illustrated in FIG. 15C to make the precision rough (that is, to reduce the precision for room temperature), and sets the processing content (processing) to "12" to clarify that linear interpolation is performed.

Also, the data processor 624 may generate new distribution data by another process other than such linear interpolation. For example, the data processor 624 may calculate the average of the room temperature in the distribution data for a certain period (for example, a period from a time of 60 minutes before the present time to the present time) and newly generate the distribution data of the calculated average room temperature.

Additionally, the data processor 624 stores, in the data storage 63, the new distribution data generated by such processing.

Also, as described above, the data provider 622 provides the corresponding distribution data to the data usage server 70 in response to a request from the data usage server 70.

Figure 16:
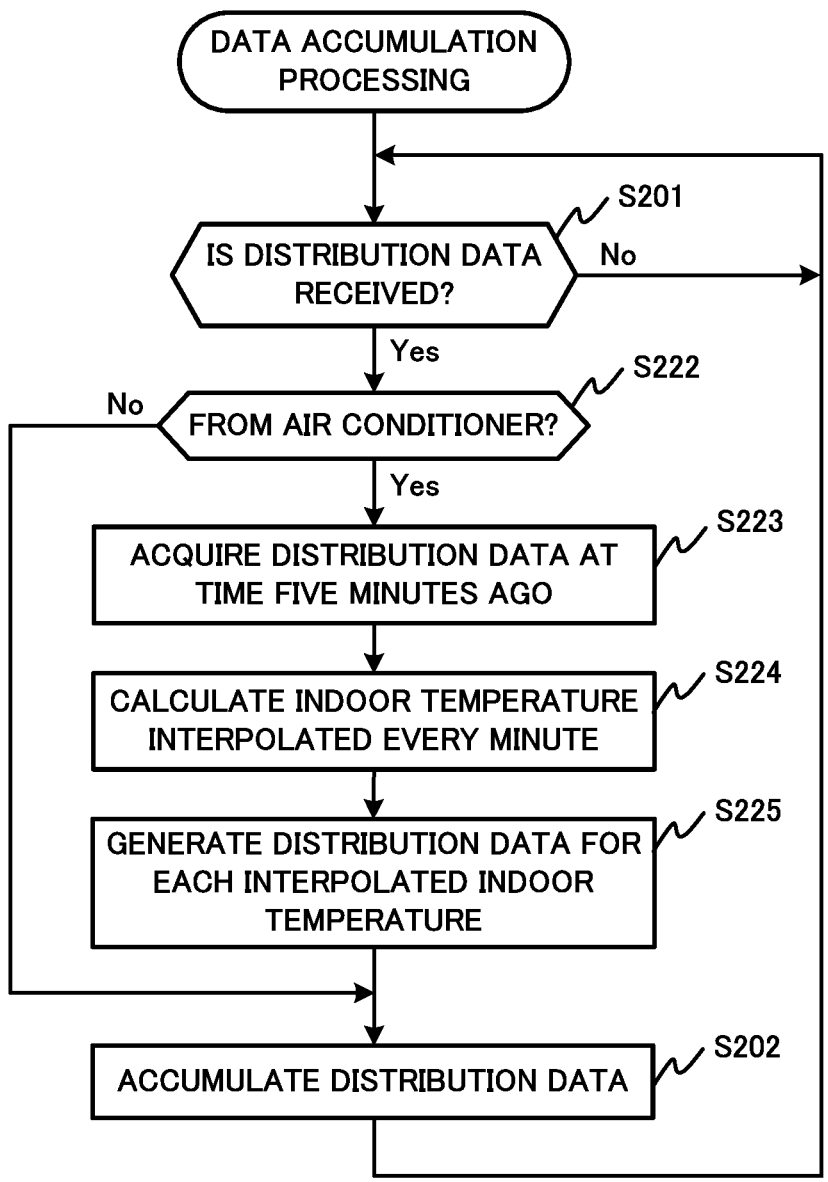
FIG. 16 is a flow chart illustrating one example of data accumulation processing performed by the data collection server.
Figure 17:
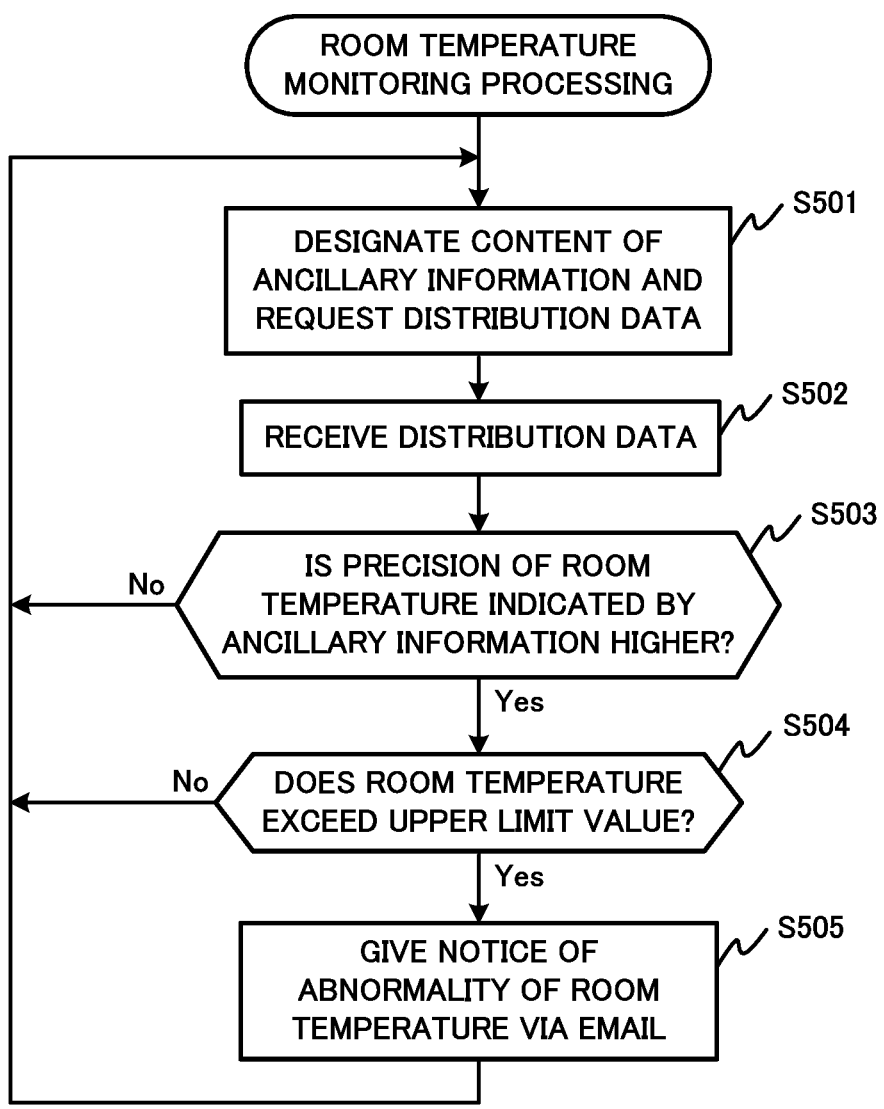
FIG. 17 is a flow chart illustrating one example of room temperature monitoring processing performed by the data usage server.

Hereinafter, operation of the data distribution system 1 according to Embodiment 3 is described with reference to FIGS. 16 and 17. FIG. 16 is a flowchart illustrating one example of data accumulation processing performed by the data collection server 60. The data transmission processing executed by the devices such as the air conditioner 10, the lighting device 20, the temperature sensor 30, and the motion sensor 40 is the same processing as in FIG. 8 and thus is omitted. In FIG. 16, the same reference numerals are assigned to the same processing contents as those of the above-described data accumulation processing of FIG. 8. FIG. 17 is a flowchart illustrating one example of room temperature monitoring processing performed by the data usage server 70. The data provision processing performed by the data collection server 60 is the same processing as that in FIG. 9 and thus is omitted.

First, the data accumulation processing in the data collection server 60 is described with reference to FIG. 16.

The data collection server 60 determines whether distribution data transmitted from the device is received (step S201). Upon determination that that distribution data is not received (No in step S201), the data collection server 60 stands by until the distribution data is received.

On the other hand, when the distribution data is determined to be received (Yes in step S201), the data collection server 60 determines whether the received distribution data is distribution data from the air conditioner 10 (step S222). For example, the data collector 621 determines whether the received data is distribution data of the air conditioner 10 collected at 5-minute intervals.

Upon determination that the received data is not distribution data from the air conditioner 10 (No in step S222), the data collection server 60 makes the processing advance to step S202 described below.

On the other hand, when the received data is determined to be distribution data from the air conditioner 10 (Yes in step S222), the data collection server 60 acquires the distribution data at the time five minutes ago (step S223). That is, the data processor 624 reads, from the data storage 63, the distribution data at the time five minutes ago for the air conditioner 10.

The data collection server 60 calculates a room temperature that is interpolated every minute (step S224). For example, when the room temperature in the distribution data at the time five minutes ago that is acquired in step S223 is 25° C. and the room temperature in the distribution data at the present time that is received in step S201 is 26° C., the data processor 624 calculates, by the linear interpolation, the room temperature at the time four minutes ago as 25.2° C., the room temperature at the time three minutes ago as 25.4° C., the room temperature at the time two minutes ago as 25.6° C., and the room temperature at the time one minute ago as 25.8° C.

The data collection server 60 generates distribution data for each interpolated room temperature (step S225). For example, as illustrated in FIG. 15C, the data processor 624 generates the distribution data at the time four minutes ago, at the time three minutes ago, at the time two minutes ago, and at the time one minute ago. At this time, the data processor 624 sets the precision (resolution) to "1.0" in the distribution data illustrated in FIG. 15C to make the precision rough (that is to reduce the precision for room temperature), and sets the processing content (processing) to "12" to clarify that linear interpolation is performed.

The data collection server 60 accumulates distribution data (step S202). That is, the data collector 621 stores, in the data storage 63, the distribution data received in step S201. Also, the data processor 624 stores, in the data storage 63, the distribution data newly generated in step S225.

Next, room temperature monitoring processing in the data usage server 70 is described with reference to FIG. 17.

First, the data usage server 70 designates the contents of the ancillary information to request distribution data (step S501). For example, the data usage server 70 requests the distribution data from the data collection server 60 while designating the specific information (for example, serial numbers) of the air conditioner 10 and the temperature sensor 30 that are placed in the home (house H) whose room temperature is to be monitored.

The data usage server 70 receives the distribution data provided from the data collection server 60 (step S502).

The data usage server 70 determines whether the precision of the room temperature indicated by the ancillary information of the received distribution data is higher than that of the reference (step S503). For example, the data analyzer 721 determines whether the precision (resolution) in the ancillary information is not greater than "0.1". Also, the precision (resolution) is described as "0.5" in the distribution data of the air conditioner 10 illustrated in FIG. 3C, the precision (resolution) is described as "1.0" in the interpolated distribution data of the air conditioner 10 illustrated in FIG. 15C, and the precision (resolution) is described as "0.1" in the distribution data of the temperature sensor 30 illustrated in FIG. 4A. Accordingly, only the precision of the room temperature in the distribution data of the temperature sensor 30 is determined to be higher than the reference.

When the data usage server 70 determines that the precision of the room temperature indicated by the ancillary information is not higher than the reference (No in step S503), the data usage server 70 returns to the processing to step S501 described above.

On the other hand, when the precision of the room temperature indicated by the ancillary information is determined to be higher than the reference (Yes in step S503), the data usage server 70 determines whether the room temperature exceeds an upper limit value (step S504). However, the room temperature may be compared not only with the upper limit value as described above but also with a lower limit value.

When the data usage server 70 determines that the room temperature does not exceed the upper limit (No in step S504), processing returns to step S501 described above.

On the other hand, when the room temperature is determined to exceed the upper limit (Yes in step S504), the data usage server 70 gives notice of abnormality of the room temperature by an email (step S505). That is, the service provider 722 sends an email to the registered user's address to give notice of the abnormality of the room temperature.

Only the process of giving notice of the abnormality of the room temperature is illustrated in the room temperature monitoring processing illustrated in FIG. 17. However, the data usage server 70 may be configured to (i) accumulate the distribution data provided from the data collection server 60 and (ii) display a change in the room temperature in time series when an inquiry on the room temperature is made from a user's terminal (for example, a smartphone). In this case, the room temperature may be displayed using the distribution data of the temperature sensor 30 with high precision. Also, in a case in which information on the installation locations of the air conditioner 10 and the temperature sensor 30 (for example, an upper portion of a room, a desktop and the like) are included in the ancillary information, the respective location and room temperature may be displayed together. As described above, since the distribution data of the air conditioner 10 is interpolated every minute, the user's terminal can display, in time series at one-minute intervals, the room temperature measured by the temperature sensor 30 and the room temperature measured by the air conditioner 10.

By such data accumulation processing illustrated in FIG. 16, the distribution data including the device data and the ancillary information is appropriately processed and accumulated in the data collection server 60, and the useful data distribution is available by the room temperature monitoring processing illustrated in FIG. 17. That is, since new distribution data is generated by processing, more detailed services can be provided to the user. Additionally, the user can verify the validity, reliability and the like of the distribution data based on the ancillary information. In addition, the user can properly use the distribution data based on the ancillary information. That is, since the ancillary information is added to the distribution data, the user can easily process or easily make proper use of the distribution data (device data). For example, when calculating device data (for example, temperature data) included in distribution data acquired from different installation locations, significant figures can be appropriately determined in accordance with precision or resolution, and high-precision device data can be used for the determination and, on the contrary, the low-precision device data can be used only for displaying such device data. Also, even in a case in which the device includes a plurality of sensors different in precisions in order to measure the same physical quantity, the user can appropriately determine, in accordance with circumstances, which of physical quantities measured by the sensors is to be used since the ancillary information is added to the distribution data. In this case, by the determination in accordance with circumstances, use is possible of useful distribution data alone and data traffic can be also optimized. The data usage server 70 can provide various services other than the room temperature monitoring processing described above. In other words, the data usage server 70 can provide various services by (i) using the ancillary information included in the distribution data provided from the data collection server 60 and (ii) building an algorithm optimized in accordance with the services.

As a result, data that is more appropriate can be distributed in the data distribution system 1 according to Embodiment 3 of the present disclosure.

Also, in the above-described embodiments, the program executed by the controllers 62 and 72 of the data collection server 60 and the data usage server 70 can be stored on a computer readable recording medium such as a compact disc-read only memory (CD-ROM), a digital versatile disc-read only memory (DVD-ROM), a magneto-optical disk (MO), a USB flash device, or a memory card, and then the recording medium storing the program can be distributed. Additionally, the program may be installed in a dedicated or general-purpose computer, thereby enabling the computer to function as the data collection server 60 and the data usage server 70 of the above-described embodiments.

Alternatively, the above-described program may be stored, in advance, in a storage device that is included in a server device on a communication network such as the Internet, and the program may be downloaded onto the computer, for example, by superimposing the program on a carrier wave. Also, the above-described processing can be achieved by launching and executing the program while transferring the program via the communication network. Additionally, the above-described processing can be also achieved by (i) executing the whole of or a part of the program on the server device and (ii) executing the program while the computer is transmitting and receiving information on the processing via the communication network.

Also, in a case in which the above-described processing is achieved by apportionment between an operating system (OS), in cooperation between the OSs and the application program, or the like, storage of only a portion other than the OSs in the above-described recording medium is permissible and such a recording medium may be distributed or the portion other than the OSs may be downloaded onto the computer.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

The present disclosure can be used with advantage for a server device, a data distribution system, a data provision method, and a program that can distribute data that is more appropriate.

REFERENCE SIGNS LIST

1 Data distribution system
10 Air conditioner
20 Lighting device
30 Temperature sensor
40 Motion sensor
50 Router
60 Data collection server
70 Data usage server
11, 61, 71 Communicator
12, 62, 72 Controller
13 Main function unit
121 Main function controller
122 Data generator
63 Data storage
64 Ancillary information database
621 Data collector
622 Data provider
623 Distribution data generator
624 Data processor
721 Data analyzer
722 Service provider

The invention claimed is:

1. A server device supporting a data distribution system having a plurality of devices arranged and communicably connected in a home network, a workplace network, or a facility network of a plurality of home networks, workplace networks, and/or facility networks, comprising:
 a processor; and
 a storage configured to store device data received from a device of the plurality of devices, the device being an appliance configured to perform a main operation or a sensor configured to monitor an environment in the home, the workplace, or the facility;
 the processor is configured to
  receive via wired or wireless communication, the device data obtained from the device, the device data corresponding to the device, and the device data indicating a current value of a detection state of the device and a device identifier that identifies the device;
  responsive to receiving the device data, generate distribution data corresponding to the device by adding, to the device data, an ancillary information stored in an ancillary information database as corresponding to the device, the ancillary information stored in the ancillary information database which is added to the device data as the generated distribution data indicating an acquisition time information, a precision of the device data and a content of processing of the device data, wherein the content of processing indicates a process by which the processor executes a calculation on the device data to generate the distribution data including determining calculation precision from the calculation according to the precision whereby the precision may be different from calculation precision of the calculation, and store the distribution data into the storage; and responsive to receiving a request for distribution data that specifies content of the ancillary information, transmit, via wired or wireless communication, to an outside, the distribution data determined to correspond to the request and that includes the device data stored by the processor and the ancillary information indicating the precision of the device data and the content of processing of the device data.

2. A server device supporting a data distribution system having a plurality of devices arranged and communicably connected in a home network, a workplace network, or a facility network of a plurality of home networks, workplace networks, and/or facility networks, comprising:

a processor; and a storage configured to store distribution data received from a device of the plurality of devices, the device being an appliance configured to perform a main operation or a sensor configured to monitor an environment in the home, the workplace, or the facility;

the processor is configured to receive, via wired or wireless communication, the distribution data corresponding to the device, the distribution data including device data and an ancillary information, the device data corresponding to the device, and the device data indicating a current value of a detection state of the device and a device identifier that identifies the device, the ancillary information indicating an acquisition time information, the ancillary information including a precision of the device data and a content of processing of the device data, the distribution data being obtained from a device, wherein the content of processing indicates a process by which the processor executes a calculation on the device data to generate the distribution data, and store the distribution data into the storage;

responsive to receiving the device data, generate new distribution data corresponding to the device, in time series based on the acquisition time of the received distribution data, the new distribution data which is generated including the ancillary information and the device data of the received distribution data corresponding to the device, the precision of the ancillary information in the new distribution data being set based on the precision in the ancillary information of the received distribution data, the current value of the detection state of the device set in the new distribution data being generated by the processor executing, on the current value of the detection state in one or more of a plurality of the received distribution data over time series, the process indicated in the content of processing including determining calculation precision from the calculation according to the precision whereby the precision may be different from calculation precision of the calculation, and store the new distribution data having the generated current value of the detection state into the storage in the time series with the received distribution data; and responsive to receiving a request for distribution data that specifies content of the ancillary information, transmit, via wired or wireless communication, to an outside, the distribution data determined to correspond to the request and that includes the received distribution data and the new distribution data stored by the processor.

3. The server device according to claim 1, wherein the ancillary information further includes at least one item of a time, a unit, a resolution, a manufacturer, or a model number.

4. A data distribution system having a plurality of devices arranged and communicably connected in a home network, a workplace network, or a facility network of a plurality of home networks, workplace networks, and/or facility networks, comprising:

a device of the plurality of devices, the device being an appliance configured to perform a main operation or a sensor configured to monitor an environment in the home, the workplace, or the facility;

a data collection server; and a data usage server, wherein the device comprises a transmitter configured to transmit device data, the data collection server comprises:

a storage configured to store device data received from the device;

a data collection server processor configured to receive, via wired or wireless communication, the device data transmitted from the device, and store the device data in the storage, the device data corresponding to the device, and the device data indicating a current value of a detection state of the device and a device identifier that identifies the device;

responsive to receiving the device data, generate distribution data corresponding to the device by adding, to the device data, an ancillary information stored in an ancillary information database as corresponding to the device, the ancillary information stored in the ancillary information database which is added to the device data as the generated distribution data indicating an acquisition time information, a precision of the device data and a content of processing of the device data, wherein the content of processing indicates the process by which the data collection server processor executes a calculation on the device data to generate the distribution data including determining calculation precision from the calculation according to the precision whereby the precision may be different from calculation precision of the calculation; and responsive to receiving a request for distribution data that specifies content of the ancillary information, provide, to the data usage server, the distribution data determined to correspond to the request and that includes the device data stored by the data collection server processor and the ancillary information indicating the precision of the device data and the content of processing of the device data, and the data usage server comprises a data usage server processor configured to transmit to the data collection server the request for distribution data that designates content of the ancillary information;

provide a service corresponding to the precision and the content of processing in the ancillary information using the distribution data provided from the data collection server.

5. A data provision method supporting a data distribution system having a plurality of devices arranged and communicably connected in a home network, a workplace network, or a facility network of a plurality of home networks, workplace networks, and/or facility networks, to be performed by a server device, the data provision method comprising:

receiving, via wired or wireless communication, device data obtained from a device of the plurality of devices, the device being an appliance configured to perform a main operation or a sensor configured to monitor an environment in the home, the workplace, or the facility, and storing the device data in a storage of the server device, the device data corresponding to the device, and the device data indicating a current value of a detection state of the device and a device identifier that identifies the device;

responsive to receiving the device data, generating distribution data corresponding to the device by adding, to the device data, an ancillary information stored in an ancillary information database as corresponding to the device, the ancillary information stored in the ancillary information database which is added to the device data as the generated distribution data indicating an acquisition time information, a precision of the device data and a content of processing of the device data, wherein the content of processing indicates the process by which a calculation is executed on the device data to generate the distribution data including determining calculation precision from the calculation according to the precision whereby the precision may be different from calculation precision of the calculation; and responsive to receiving a request for distribution data that specifies content of the ancillary information, transmitting, via wired or wireless communication, to an outside, the distribution data determined to correspond to the request and that includes the stored device data and the ancillary information indicating the precision of the device data and the content of processing of the device data.

6. A non-transitory computer-readable recording medium storing a program supporting a data distribution system having a plurality of devices arranged and communicably connected in a home network, a workplace network, or a facility network of a plurality of home networks, workplace networks, and/or facility networks, the program for causing a computer to:

receive, via wired or wireless communication, device data obtained from a device of the plurality of devices, the device being an appliance configured to perform a main operation or a sensor configured to monitor an environment in the home, the workplace, or the facility, and store the device data in a storage of the server device, the device data corresponding to the device, and the device data indicating a current value of a detection state of the device and a device identifier that identifies the device;

responsive to receiving the device data, generate distribution data corresponding to the device by adding, to the device data, an ancillary information stored in an ancillary information database as corresponding to the device, the ancillary information stored in the ancillary information database which is added to the device data as the generated distribution data indicating an acquisition time information, a precision of the device data and a content of processing of the device data, wherein the content of processing indicates the process by which a calculation is executed on the device data to generate the distribution data including determining calculation precision from the calculation according to the precision whereby the precision may be different from calculation precision of the calculation; and responsive to receiving a request for distribution data that specifies content of the ancillary information, transmit, via wired or wireless communication, to an outside, the distribution data determined to correspond to the request and that includes the stored device data in the storage and the ancillary information indicating the precision of the device data and the content of processing of the device data.

7. The server device according to claim 2, wherein the ancillary information further includes at least one item of a time, a unit, a resolution, a manufacturer, or a model number.

8. The server device according to claim 1, wherein the processor is further configured to:

responsive to receiving the device data, generate new distribution data by referring to a plurality of the distribution data corresponding to the device, the new distribution data including the ancillary information corresponding to the device and the received device data, wherein the processor sets the precision in the ancillary information of the generated distribution data to be lower than precision in the ancillary information of the referred distribution data.

9. The server device according to claim 2, wherein the processor is further configured to:

responsive to receiving the device data, generate new distribution data by referring to a plurality of the distribution data corresponding to the device, the new distribution data including the ancillary information corresponding to the device and the received device data, wherein the processor sets the precision in the ancillary information of the generated distribution data to be lower than precision in the ancillary information of the referred distribution data.

10. The server device according to claim 1, wherein the processor is further configured to, responsive to receiving the device data, generate new distribution data corresponding to the device, in time series based on the acquisition time of the received distribution data, the new distribution data which is generated including the ancillary information and the device data of the received distribution data corresponding to the device, the precision of the ancillary information in the new distribution data being set based on the precision in the ancillary information of the received distribution data, the current value of the detection state of the device set in the new distribution data being generated the processor executing, on the current value of the detection state in one or more of a plurality of the received distribution data over time series, the process indicated in the content of processing and store the new distribution data having the generated current value of the detection state into the storage in the time series with the received distribution data.

11. The data distribution system according to claim 4, wherein the data collection server processor is further configured to, responsive to receiving the device data, generate new distribution data corresponding to the device, in time series based on the acquisition time of the received distribution data, the new distribution data which is generated including the ancillary information and the device data of the received distribution data corresponding to the device, the precision of the ancillary information in the new distribution data being set based on the precision in the ancillary information of the received distribution data, the current value of the detection state of the device set in the new distribution data being generated the processor executing, on the current value of the detection state in one or more of a plurality of the received distribution data over time series, the process indicated in the content of processing and store the new distribution data having the generated current value of the detection state into the storage in the time series with the received distribution data.

12. The data provision method according to claim 5, further comprising, responsive to receiving the device data, generating new distribution data corresponding to the device, in time series based on the acquisition time of the received distribution data, the new distribution data which is generated including the ancillary information and the device data of the received distribution data corresponding to the device, the precision of the ancillary information in the new distribution data being set based on the precision in the ancillary information of the received distribution data, the current value of the detection state of the device set in the new distribution data being generated the server device executing, on the current value of the detection state in one or more of a plurality of the received distribution data over time series, the process as indicated in the content of processing and storing the new distribution data having the generated current value of the detection state into the storage in the time series with the received distribution data.

13. The non-transitory computer-readable recording medium according to claim 6, wherein the program further causes the computer to, responsive to receiving the device data, generate new distribution data corresponding to the device, in time series based on the acquisition time of the received distribution data, the new distribution data which is generated including the ancillary information and the device data of the received distribution data corresponding to the device, the precision of the ancillary information in the new distribution data being set based on the precision in the ancillary information of the received distribution data, the current value of the detection state of the device set in the new distribution data being generated the processor executing, on the current value of the detection state in one or more of a plurality of the received distribution data over time series, the process indicated in the content of processing and store the new distribution data having the generated current value of the detection state into the storage in the time series with the received distribution data.

\* \* \* \* \*